United States Patent
Blau et al.

(10) Patent No.: US 12,319,300 B2
(45) Date of Patent: Jun. 3, 2025

(54) METHOD FOR EXECUTING A DRIVING TASK IN A DECENTRALIZED CONTROL UNIT SYSTEM, AND DECENTRALIZED CONTROL UNIT SYSTEM

(71) Applicant: Robert Bosch GmbH, Stuttgart (DE)

(72) Inventors: Anja Blau, Stuttgart (DE); Benjamin Schill, Ditzingen-Heimerdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 312 days.

(21) Appl. No.: 18/054,715

(22) Filed: Nov. 11, 2022

(65) Prior Publication Data

US 2023/0166747 A1    Jun. 1, 2023

(30) Foreign Application Priority Data

Nov. 30, 2021    (DE) ...................... 10 2021 213 472.6

(51) Int. Cl.
- *B60W 50/02*    (2012.01)
- *B60R 16/023*    (2006.01)
- *G07C 5/02*    (2006.01)
- *G06F 11/07*    (2006.01)

(52) U.S. Cl.
CPC ..... *B60W 50/0225* (2013.01); *B60R 16/0231* (2013.01); *B60W 50/0205* (2013.01); *G07C 5/02* (2013.01)

(58) Field of Classification Search
CPC ............. G06F 11/0709; G06F 11/0736; G06F 11/0751; B60W 50/02; B60W 50/0205; G07C 5/02; B60R 16/023
See application file for complete search history.

(56) References Cited

U.S. PATENT DOCUMENTS

| | | | |
|---|---|---|---|
| 6,349,996 B1* | 2/2002 | Heckmann | B60T 8/321 303/122.04 |
| 2006/0015231 A1* | 1/2006 | Yoshimura | B60L 3/0076 701/1 |
| 2007/0083305 A1* | 4/2007 | Okada | G07C 5/008 701/31.4 |
| 2013/0110313 A1* | 5/2013 | Rupf | H04L 5/1469 701/1 |
| 2014/0094998 A1* | 4/2014 | Cooper | B61L 15/0036 701/2 |
| 2022/0402514 A1* | 12/2022 | Kousselson | B60W 10/184 |

* cited by examiner

*Primary Examiner* — Tan Q Nguyen

(74) *Attorney, Agent, or Firm* — NORTON ROSE FULBRIGHT US LLP (57) ABSTRACT

A method for executing a driving task in a decentralized control unit system and a decentralized control unit system are provided. The control unit system includes at least two control units that are designed as senders, and at least one control unit that is designed as a receiver. The at least two senders and the at least one receiver in each case have activity states and operating states. The two senders and the receiver in each case check their own activity states. The two senders' own activity states are compared to the receiver's own activity state. An evaluation of operating states is carried out if the two senders' and the receiver's own activity states are in each case error-free. The driving task is executed if one of the two senders and the receiver in each case has a dynamic operating state.

12 Claims, 5 Drawing Sheets

METHOD FOR EXECUTING A DRIVING TASK IN A DECENTRALIZED CONTROL UNIT SYSTEM, AND DECENTRALIZED CONTROL UNIT SYSTEM

CROSS REFERENCE

The present application claims the benefit under 35 U.S.C. § 119 of German Patent Application No. DE 10 2021 213 472.6 filed on Nov. 30, 2021, which is expressly incorporated herein by reference in its entirety.

FIELD

The present invention relates to a method for executing a driving task in a decentralized control unit system. Moreover, the present invention relates to a decentralized control unit system in which the method is carried out.

SUMMARY

An object of the present invention is to improve a method for executing a driving task in a decentralized control unit system. Moreover, an object of the present invention is to provide an improved decentralized control unit system in which the method is carried out.

This object may be achieved by the features of the present invention. Advantageous specific embodiments of the present invention are disclosed herein.

In accordance with an example embodiment of the present invention, a method for executing a driving task in a decentralized control unit system and a decentralized control unit system are provided. For executing the driving task, the decentralized control unit system includes at least two control units that are designed as senders, and at least one control unit that is designed as a receiver. In addition, the control units that are designed as senders may likewise form a connection with one another in the form of senders and receivers. The at least two senders and the at least one receiver are in each case communicatively linked to one another. The at least two senders and the at least one receiver in each case have activity states and operating states. The provided method includes the steps:
  checking, in each case by the at least two senders and the at least one receiver, their own activity states in a first step;
  comparing in each case the at least two senders' own activity states to the at least one receiver's own activity state by the at least one receiver in a second step;
  carrying out an evaluation of operating states by the at least one receiver in a third step if the at least two senders' own activity states and the at least one receiver's own activity state are/is error-free in each case, and
  executing the driving task by the at least one receiver in a fourth step if one of the at least two senders and the at least one receiver in each case has a dynamic operating state.

The increasing complexity in the area of driver assistance systems has resulted in an increased number of involved control units in the vehicle. The control units are usually used as executing units for driving tasks in the vehicle, which in this regard carry out computing tasks or computations, evaluations, comparisons of information, plausibility checks, etc., i.e., which in each case represent information sources or communication sources and which may function as senders and/or receivers. As the number of control units in the vehicle increases, so does the number of communication interfaces between the control units, as well as the need for correctly determining the quality and/or the state (active state) of the information sources. Activity states and operating states, for example, are possible as a state. The activity states may reflect the individual control units' present own state estimations, and the operating states may correspond to dynamic evaluations concerning changes in their own states based on obtained activity states of other control units and/or obtained sensor information and its interpretation, in each case during ongoing vehicle operation.

In principle, a distinction may be made as to whether computing tasks, computations, processing steps, etc. are executed by a control unit system in a distributed (decentralized) manner or in a centralized manner. Both approaches share the feature that at a certain point in the computation chain, the pieces of information (for example, with regard to the above-mentioned states of the individual control units) from different sources must be combined. The greater the number of involved information sources that are provided, the greater also is the required number of necessary comparison computations. On the control units, which are designed as receivers and use this information from the control units, in each case designed as senders, but which themselves do not represent a source of this information, the combination of various information sources requires either a fusion of the results, a comparison of the information, or a plausibility check of the incoming information with respect to internal information.

The method according to the present invention is advantageously suited for decentralized control unit systems in which the control unit, which is designed as a receiver, requires that the information from the control unit, which is designed as a sender, be checked by the sender itself (i.e., the sender's own activity state is error-free), and the receiver may then trust the data of the sender. A control unit may include a control device and/or a sensor unit, for example. In a decentralized control unit system, error-containing activity states (and/or deviations, which generally represent significant deviations) of the individual control units must be recognized and transmitted in order to increase the trustworthiness and reliability of the system, and in order to not represent a risk for driving tasks that affect the safety of persons in the vehicle. This is advantageously ensured by the provided method together with the provided decentralized control unit system.

According to an example embodiment of the present invention, the above-mentioned first step may mean that the receiver checks its own activity state, and the at least two senders likewise in each case check their own activity states. For the second step, the at least two senders may transmit their own checked activity states in each case to the receiver via the communicative link, and the receiver may then carry out the comparison of the activity states. If the at least two senders' own activity states as well as the receiver's own activity state are/is in each case error-free, i.e., all data from the senders may be trusted, the receiver evaluates the individual operating states of the at least two senders and of the receiver. Since the operating states may be different and, for example, may indicate an initialization (static operating state) and may also already indicate complete operational readiness (dynamic operating state), the evaluation by the receiver in the third step is essential for the correct interpretation of the results, and for a correct response in the form of a state estimation and making a response based on these results. Only when dynamic operating states are present does the receiver execute the driving task in the fourth step.

The unambiguous and correct identification of the presence of such an overall dynamic state of readiness during operation is therefore very important. The driving task may be an adaptive cruise control (ACC) function, for example, or may be designed as alternative driver assistance systems, for example as an automatic lane-keeping assistant system (LKAS), etc. The fourth step may also include ascertaining a dynamic value contribution of the senders to the overall computation result. For example, a contribution quantity for the driving task may be defined for each sender. This contribution may be centrally checked by a control unit that is designed as a receiver or ECU; for example, data may be fused or also compared. The execution of the driving task may include, for example, a fusion and/or a comparison and/or a plausibility check of data of the individual senders or of the receiver.

In a further specific embodiment of the present invention, the at least two senders and/or the at least one receiver are/is designed, in each case during checking of their/its own activity state(s), to check in the first step whether a voltage drop and/or a deviation are/is present at the at least two senders and/or at the at least one receiver. An own activity state of the at least two senders and/or of the at least one receiver contains errors in each case if a voltage drop and/or a deviation are/is present at the at least two senders and/or at the at least one receiver. An own activity state of the at least two senders and/or of the at least one receiver is error-free in each case if no voltage drop and/or no deviation are/is present at the at least two senders and/or at the at least one receiver.

The receiver may thus trust the data of the at least two senders, since the at least two senders transmit the information to the receiver which the senders themselves, i.e., their own activity states, have checked, and have correspondingly transmitted this information, also error-free, to the receiver. An error-containing own state (or an excessively large deviation, for example) of the computing control unit that receives the information from various other control devices, i.e., designed as receivers, for example, may likewise result in the computation results not being trustworthy. For example, an own activity state may be error-free, or alternatively may be designed to be correct, healthy, or "in spec," i.e., within specifications, trustworthy, etc. Thus, the reliability of the system is advantageously improved, and the safety may be optimized in the case of an overarching driving task that is executed in a decentralized manner on the control units of a vehicle, for example the above-mentioned adaptive cruise control function. In particular, in the provided manner it may be instantaneously recognized whether the data of a control unit or of a sensor unit contain errors, and countermeasures may be quickly initiated, such as outputting an error message, or not further trusting the faulty control unit or sensor unit, or lowering the confidence level via an appropriate identification.

In a further specific embodiment of the present invention, the at least one receiver in each case triggers an error response for the affected sender and/or for the affected receiver in the second step if the at least two senders and/or the at least one receiver identify/identifies their/its own activity state(s) as containing errors. The error response is designed in the form of a substitute response and/or in form of an error message. A substitute response involves the affected sender and/or the affected receiver remaining disregarded for the third step, and only the operating state(s) of one of the at least two senders and/or of the at least one receiver, whose own activity state(s) in each case have/has been identified as error-free in the first step, being evaluated.

In comparison to hardware state estimators, which often are exclusively static, on the individual control units it may advantageously be considered, with the aid of the provided method and system, how the states of the control units behave with respect to one another in dynamic operation, and in addition suitable measures such as an error response or the like may be taken early. This is because during operation, the activity states or the operating states of a control unit (for example, due to undervoltage, driving states, external temperature influences, loose contacts of cables, short circuits, etc.) together with activity states or operating states of other control units may result in various combinations that must be taken into account for a state estimation in a distributed/decentralized control unit system that includes different sources. The taking into account is therefore important so that the computation result is also valid on the receiver that ascertains this, since the activity state, i.e., its own state, is correct (i.e., functional or "healthy"). Prior to the triggering of an error response, for example a debouncing of this signal may initially be carried out and a possible response made, i.e., a classification of the present circumstance: for example, a response that no signal is transmitted, or the signal or this information is transmitted to the receiver only much later than a deviation and/or a present voltage drop, etc.

According to an example embodiment of the present invention, a substitute response may be made instantaneously, for example, if a camera, as a sender, has an error-containing activity state (for example, due to a color error that is present), and in contrast some other sensor, as a sender, has an activity state that is error-free. Prior to carrying out the evaluation of the operating states of the stated units, the receiver, for example as a substitute response, may trust the other sensor, whose transmitted activity state is error-free, instead of the data of the camera. The evaluation of the operating states may then be based on the operating states of the receiver and of the other sensor.

In a further specific embodiment of the present invention, the operating states of the at least two senders and/or of the at least one receiver in each case correspond to at least one and/or a combination of the following states: operational, non-operational, initialization, delay, preprocessing, shutdown, dynamic, static. A dynamic operating state corresponds in particular to the "dynamic" state. Further dynamic operating states such as "operational," etc., are possible. Based on the consideration of the individual operating states, during ongoing operation the further processing of the data or information may be correctly interpreted, and the safety, reliability, and trustworthiness may thus be improved. In addition, the provided method may be implemented on receivers and sender control devices in a simple but consistent manner.

In a further specific embodiment of the present invention, the checking and comparing of the own activity states in the first and second steps are periodically repeated. The periodic repetition of the checking and comparison of the own activity states may be implemented as continuous monitoring, for example. A distinction may be made between the following cases, for example: all control units have no error-containing activity states, or one or multiple control units, for example senders, have an error-containing activity state. If an own activity state has been ascertained as error-free in the continuous monitoring, i.e., as "in spec" for the further processing of the data, for example, in the next step it is ascertained which state combination (based on the operating states) the individual control units are in relative to one another. This procedure advantageously allows the correct interpretation of the computations, is quickly, easily, and cost-effectively implementable, and thus increases the safety in the vehicle. In addition, a long-term basis of trust may be established, based on the continuous monitoring or the above-mentioned periodic repetition of the individual steps.

In a further specific embodiment of the present invention, the checking and comparing of the own activity states in the first and second steps are implementable with the aid of a matrix. This embodiment further simplifies the implementation of the provided method, provides better clarity concerning the possible scenarios for the individual state combination of the control units, and offers the advantage of a quicker response option.

According to the present invention, in addition, a computer program and a machine-readable memory medium are provided. The computer program includes commands which, when the computer program is executed by a computer, prompt the computer to carry out the provided method. The provided computer program is stored on the machine-readable memory medium. Uncomplicated safeguarding and execution of the provided method are thus advantageously possible, using conventional methods. Thus, no additional complexity arises.

The advantageous embodiments and refinements of the present invention explained above and/or set forth below may be applied individually or also in arbitrary combination with one another.

The above-described properties, features, and advantages of the present invention as well as the manner in which they are achieved will become clearer and more understandable in conjunction with the following description of exemplary embodiments, which are explained in greater detail with reference to the figures.

DETAILED DESCRIPTION OF EXAMPLE EMBODIMENTS

It is pointed out that the figures are merely schematic and not true to scale. In this sense, components and elements shown in the figures may be illustrated in an overly large scale or in reduced scale for better understanding. In addition, it is pointed out that the reference numerals in the figures have been selected to be unchanged when elements and/or components having an identical design are involved.

Figure 1:
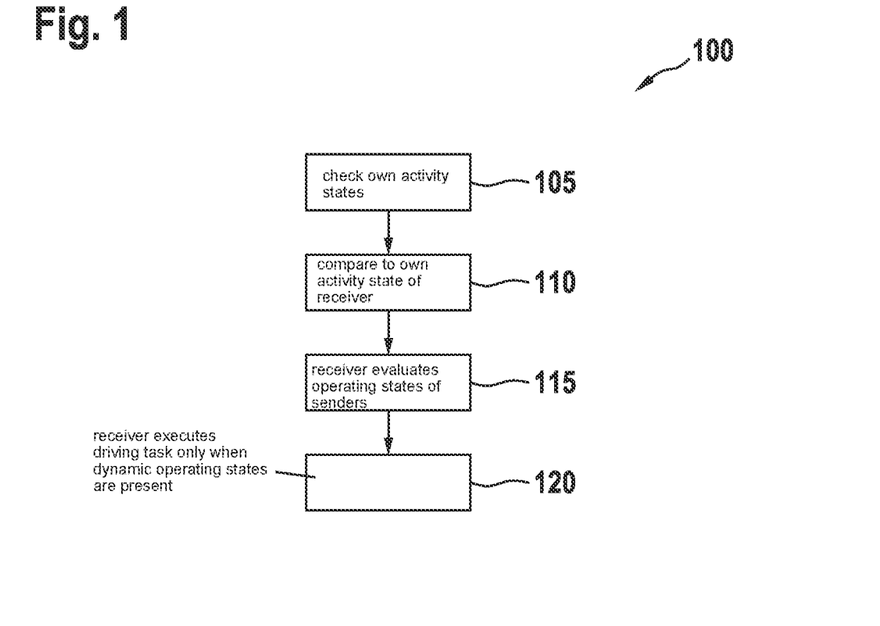
FIG. 1 shows a schematic illustration of a provided method for executing a driving task according to a first specific embodiment of the present invention.
Figure 5A:
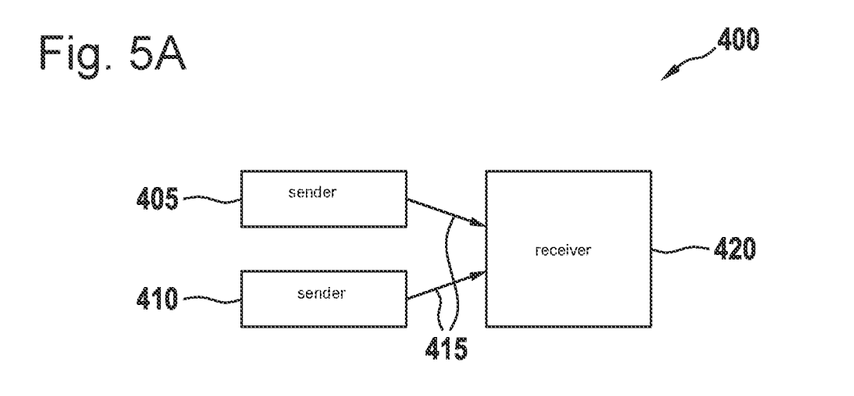
FIG. 5A shows a schematic illustration of a decentralized control unit system according to a first specific embodiment of the present invention.
Figure 6:
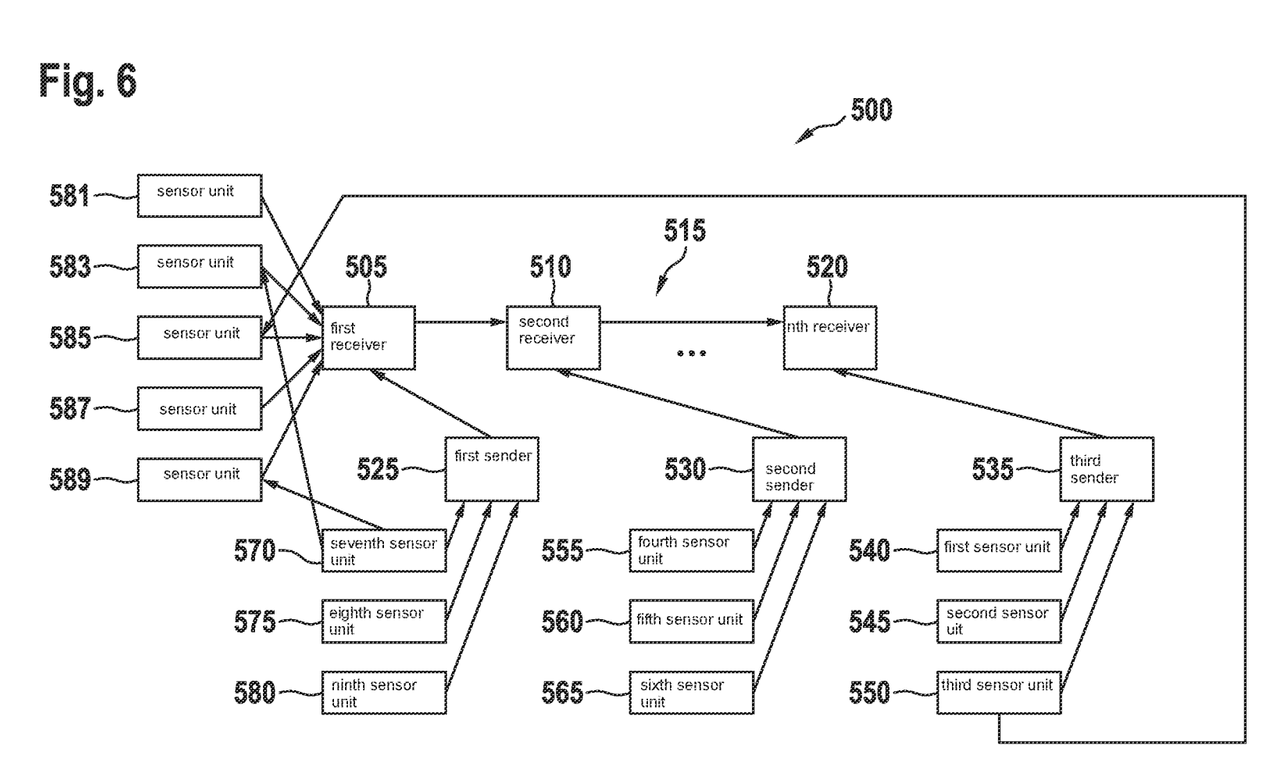
FIG. 6 shows a schematic illustration of a decentralized control unit system according to a second specific embodiment of the present invention.

FIG. 1 shows a schematic illustration of a method 100 for executing a driving task in a decentralized control unit system 400 according to a first specific embodiment. Decentralized control unit system 400 may have a simplified structure, for example, as in FIG. 5A. In addition, decentralized control unit system 500 may also have a more complex structure, as illustrated in FIG. 6. For a simpler explanation, method 100 in FIG. 1 is explained with regard to the structure of decentralized control unit system 400 in FIG. 5A, although method 100 is in no way limited to same. For executing the driving task, for example an adaptive cruise control (ACC) function or an alternative driving task for a driver assistance system in a vehicle, decentralized control unit system 400 in FIG. 5A includes at least two control units, designed as senders 405, 410, and at least one control unit, designed as a receiver 420. It is also possible for senders 405, 410 at the same time to be receivers, and for receiver 420 at the same time to be a sender. The control units may be designed in the form of control devices and/or sensor units, for example. The at least two senders 405, 410 and the at least one receiver 420 are in each case communicatively linked to one another. The communicative link is indicated by arrows 415, and in the present case is depicted only unidirectionally, but alternatively may also be implemented bidirectionally. The at least two senders 405, 410 and the at least one receiver 420 in each case have activity states and operating states.

The activity states may, for example, reflect present own state estimations of the individual control units, and the operating states may correspond to dynamic evaluations of changes in the own states due to obtained activity states of other control units and/or obtained sensor information and its interpretation, in each case during ongoing vehicle operation. Examples of possible operating states are in particular: operational, non-operational, initialization, delay, preprocessing, shutdown, dynamic, and static. A dynamic operating state may in particular correspond to the "dynamic" state. Further dynamic operating states such as "operational," etc., are possible. The at least two senders 405, 410 and/or receiver 420 may in each case have one of the stated operating states and/or a combination of various stated operating states. In particular for a combination of various types of operating states, it is necessary to carry out an evaluation to allow data to be correctly interpreted and for suitable measures to be deduced, for example generating a wait instruction if a sender 405 only has the "initialization" operating state (i.e., apparently is not yet ready for a data exchange, or the like), but receiver 420 already has the "dynamic" state, i.e., a dynamic operating state, on the basis of which the driving task could be executed.

A first step 105 of method 100 in FIG. 1 includes the checking of own activity states by the at least two senders 405, 410 and the at least one receiver 420 in each case. Above-mentioned first step 105 may mean that receiver 420 checks its own activity state, and the at least two senders 405, 410 likewise in each case check their own activity states. The own activity states of the at least two senders 405, 410 in each case are compared to the own activity state of the at least one receiver 420 in a second step 110. For the second step, the at least two senders 405, 410 may transmit their own checked activity states in each case to receiver 420 via communicative link 415, and the receiver may then carry out the comparison of the activity states in second step 110. If the own activity states of the at least two senders 405, 410 are in each case error-free, i.e., all data from senders 405, 410 and the own activity state of receiver 420 may be trusted, receiver 420 evaluates the individual operating states of the at least two senders 405, 410 and of receiver 420 in a third step 115.

Since the operating states may be different as explained above, and for example an initialization (static operating state) may likewise also already indicate complete operational readiness (dynamic operating state), the evaluation by receiver 420 in third step 115 is essential for the correct interpretation of the results. Receiver 420 executes the driving task in fourth step 120 only when dynamic operating states are present. For this purpose, generally one of the at least two senders 405, 410 (or at best, both senders 405, 410) as well as receiver 420 in each case have a dynamic operating state. Fourth step 120 may also include ascertaining a dynamic value contribution of senders 405, 410 to the overall computation result. For example, a contribution quantity for the driving task may be defined for each sender 405, 410. This contribution may be checked centrally by a receiver 420, for example as soon as data may be fused or also compared. The execution of the driving task may include, for example, a fusion and/or a comparison and/or a plausibility check of data of individual senders 405, 410 or of receiver 420.

Figure 2:
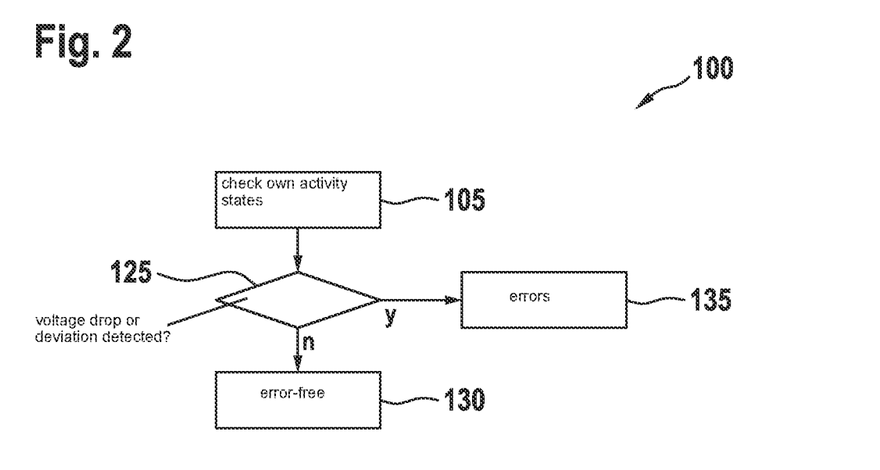
FIG. 2 shows a further schematic illustration of the provided method in FIG. 1.

FIG. 2 shows a further schematic illustration of provided method 100 in FIG. 1. For example, first step 105 may include a branch 125, with the aid of which, during checking of the own activity states, it is checked whether a voltage drop and/or a deviation are/is detected at the at least two senders 405, 410 and/or at the at least one receiver 420. Accordingly, the check of the own activity states thus includes a check of a present voltage drop and/or of a present deviation at senders 405, 410 and/or at receiver 420. A result 130 of the check with the aid of branch 125 is indicated in the n branch ("no" branch) of branch 125, for example. Result 130 includes the information that an own activity state of senders 405, 410 and/or of receiver 420 is in each case error-free if no voltage drop and/or no deviation are/is detected at senders 405, 410 and/or at receiver 420. A further result 135 for the y branch ("yes" branch) of branch 125 includes, for example, the information that a voltage drop and/or a deviation are/is present in each case at senders 405, 410 and/or at receiver 420, and an own activity state of affected sender 405, 410 and/or of affected receiver 420 accordingly contains errors in each case. Senders 405, 410 and receiver 420, as control units, may in each case include different power supplies/voltage supplies, for example, depending on whether the ignition is activated by the driver or, for example, the door is opened, etc. As the result of external environmental influences (and/or other influences) such as a loose contact of a cable due to penetrating water at the underside of a vehicle, or a separated cable due to damage to the vehicle by animals, resulting in a short circuit, a sender 405, 410 that has also ascertained its own activity state, which is error-free, at a point in time t=0 and transmitted it to receiver 420, may, at a point in time t=1 that is later than the first-mentioned point in time, no longer transmit a signal to receiver 420 because, for example, an interruption, a voltage drop, or the like is present. Thus, a deviation may also mean that a signal is no longer being transmitted. Receiver 420 may thus quickly recognize that a signal is missing or that an own activity state contains errors, and for example may not trust affected sender 405, 410 for the further processing steps.

Figure 3:
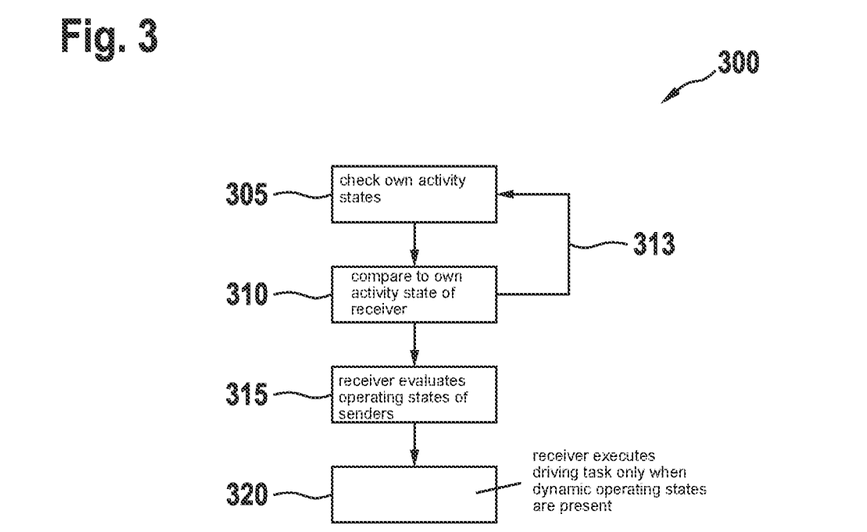
FIG. 3 shows a schematic illustration of a provided method for executing a driving task according to a second specific embodiment of the present invention.

FIG. 3 shows a schematic illustration of a provided method for executing a driving task according to a second specific embodiment 300. Individual steps 305, 310, 315, and 320 may be designed analogously to steps 105, 110, 115, and 120 in FIG. 1 or to step 105 in FIG. 2, and therefore a repetition is dispensed with and reference is made to the above explanation. Method 300 includes, for example, a periodic repetition 313 of first and second steps 305, 310, i.e., the checking and comparing of the own activity states. Periodic repetition 313 of the stated steps may be carried out as so-called continuous monitoring, for example; i.e., the at least two senders 405, 410 and/or receiver 420 in each case once again check(s) their/its own activity state(s) in a time window of a few ms (5 ms, for example), i.e., regularly carry/carries out the check for a voltage drop and/or a deviation that are/is present, and receiver 420 likewise regularly compares the transmitted activity states of senders 405, 410 and its own activity state, and may then carry out further step 315, 320 corresponding to the comparison.

Figure 4:
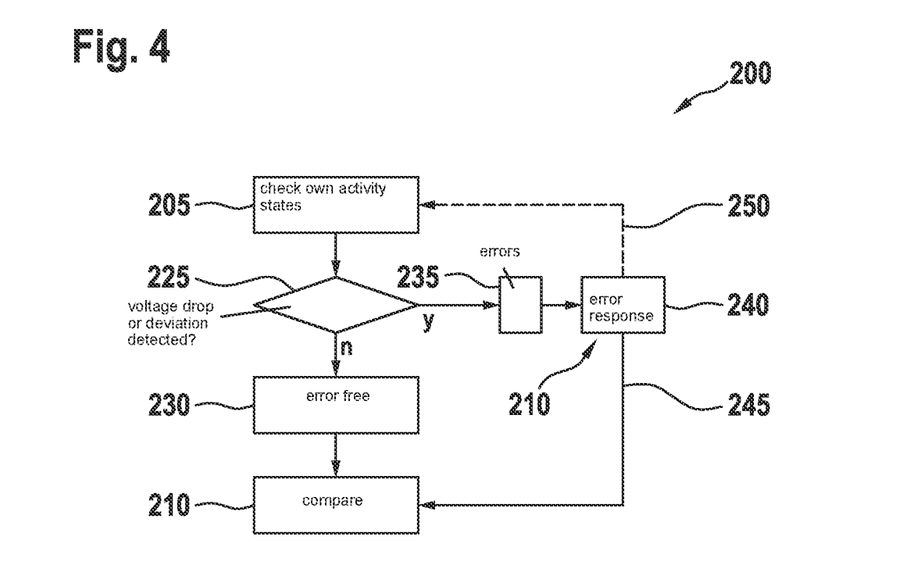
FIG. 4 shows a schematic illustration of a provided method for executing a driving task according to a third specific embodiment of the present invention.

FIG. 4 shows a schematic illustration of a provided method for executing a driving task according to a third specific embodiment 200. First step 205, a further branch 225, a result 230, and a further result 235 may correspond to first step 105, branch 125, result 130, and further result 135 in FIG. 2. Therefore, in this regard reference is made to the explanation for FIG. 2. In contrast to FIG. 2, method 200 in FIG. 4 may include an error response 240 for the y branch of further branch 225. Error response 240 may be designed in the form of an error message 250 and/or in the form of a substitute response 245. In particular, error response 240 may be used when an own activity state of senders 405, 410 and/or of receiver 420 is identified as containing errors. It is possible for receiver 420 to output an error message 250 to affected sender 405, 410, and/or to make a substitute response 245 that may mean, for example, that affected sender 405, 410 remains disregarded for the third step, i.e., carrying out the evaluation of operating states, and instead only the operating states of other sender 405, 410, whose own activity state has been identified as error-free, and of receiver 420, whose activity state is likewise designed, for example, to be error-free or "healthy," are taken into account for the evaluation.

Figure 5B:
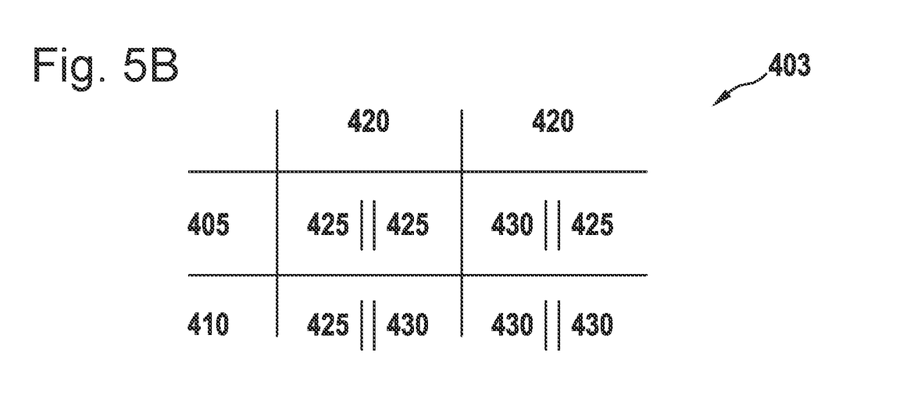
FIG. 5B shows a schematic illustration of an implementation of a matrix for the provided method in FIGS. 1 through 4 and the decentralized control unit system in FIG. 5A.

FIG. 5B shows a schematic illustration of an implementation of a matrix 403 for provided methods 100, 200, 300 in FIGS. 1 through 4 and the decentralized control unit system in FIG. 5A. In particular, the checking and comparing of own activity states in first and second steps 105, 110, 205, 210, 305, 310 may be implemented as continuous monitoring with the aid of matrix 403. In addition, it is possible to implement the evaluation of the operating states with the aid of matrix 403. Matrix 403 includes entries for receiver 420 in each case in the columns, and in a first row includes entries for first sender 405, for example, and in a second row includes entries for second sender 410. In a first entry for first sender 405 and receiver 420, first sender 405 and the receiver each have a first state 425, for example. Depending on the implementation of the matrix, this first state 425 may in each case correspond, for example, to an error-containing activity state or to a static operating state in the course of the further steps of stated methods 100, 200, 300. In a second entry for first sender 405 and receiver 420, for example a combination of a second state 430 and a first state 425 may be present. Second state 430 may then correspond, for example, to an error-free activity state or to a dynamic operating state, and first state 425 may have a design that is analogous to the above explanation. In a first entry for second sender 410 and receiver 420, for example a combination of a first state 425 and a second state 430 may be present. These may have a design as stated. In a second entry for second sender 410 and receiver 420, for example a combination of a second state 430 and a second state 430 may be present. In particular, if the implementation of matrix 403 includes the operating states as states, as a result of this stated combination, dynamic operating states may be present in each case, and receiver 420 may thus execute the driving task.

FIG. 6 shows a schematic illustration of a decentralized control unit system according to a second specific embodiment 500. Methods 100, 200, 300 in FIGS. 1 through 4, and matrix 403 in FIG. 5B, may likewise be used in decentralized control unit system 500. Control unit system 500 includes, for example, a plurality of control units, in each case designed as senders and as receivers. A first receiver 505, a second receiver 510, and an nth receiver 520, with further receivers 515 possibly situated in between, are in each case communicatively linked. For example, stated receivers 505, 510, 515, 520 may each be designed as central control units or control devices (central computers or central processing units or central ECUs), and may obtain data from various control units designed as senders in order to execute a driving task. The number of stated receivers 505, 510, 515, 520 may vary from 1 to n for the execution of driving tasks.

A first sender 525 may represent a braking unit (brake or braking functionality), for example, a second sender 530 may represent a steering unit (steering or steering functionality), and a third sender 535 may represent a drive unit (drive or drive functionality). Third sender 535 includes, for example, a first through third sensor unit 540, 545, 550 as a drive unit, second sender 530 includes, for example, a fourth through sixth sensor unit 555, 560, 565 as a steering unit, for example, and first sender 525 includes a seventh through ninth sensor unit 570, 575, 580 as a braking unit, for example. The individual sensor units may each be typical sensor units or sensors for a drive unit, a steering unit, and a braking unit. First through third senders 525, 530, 535 may also be designed in each case as receivers for the stated sensor units, as indicated by the arrows, which correspond to information interactions or communicative links. Here as well, a bidirectional communication may also be possible in addition to the illustrated unidirectional communication. This applies for all interactions between the illustrated components in FIG. 6.

Control unit system 500 also includes a tenth through fourteenth sensor unit 581, 583, 585, 587, 589, it being possible, for example, for tenth sensor unit 581 to be designed as an ultrasonic sensor unit or ultrasonic sensor, for eleventh sensor unit 583 to be designed, for example, as a video sensor unit or video sensor or camera, etc., which may record video sequences, for twelfth sensor unit 585 to be designed, for example, as a cloud-based sensor unit (or cloud-based information source) that includes cloud-based information, for thirteenth sensor unit 587 to be designed as a LIDAR sensor unit or as a LIDAR sensor, for example, and for fourteenth sensor unit 589 to be designed as a radar sensor unit or radar sensor, for example. Stated tenth through fourteenth sensor unit 581, 583, 585, 587, 589, in each case as a sender, for example, may transfer information, such as the above-mentioned own activity states, etc., to first receiver 505. In addition, first through nth receivers 505, 510, 515, 520 may in each case check their own activity states and exchange this information with one another according to the above method steps.

At the same time, for example eleventh sensor unit 581, twelfth sensor unit 583, and fourteenth sensor unit 589 may in each case also represent a receiver for the information of seventh sensor unit 570 (for eleventh sensor unit 583 and fourteenth sensor unit 589 as senders in each case, for example) and for the information of third sensor unit 550 (for twelfth sensor unit 583 as sender, for example). The plurality of sensor units may be necessary for control unit system 500, for example due to redundancy with an increasing level or an increasing advanced driver assistance system (ADAS) level on the way to an autonomous vehicle. For each communication interaction or information interaction, in each case the own activity states may be initially checked and compared if the own activity states are in each case error-free, and the computation may be continued; i.e., the evaluation of the individual operating states, in particular the individual combinations of the different operating states, may be carried out as described above.

Figure 7:
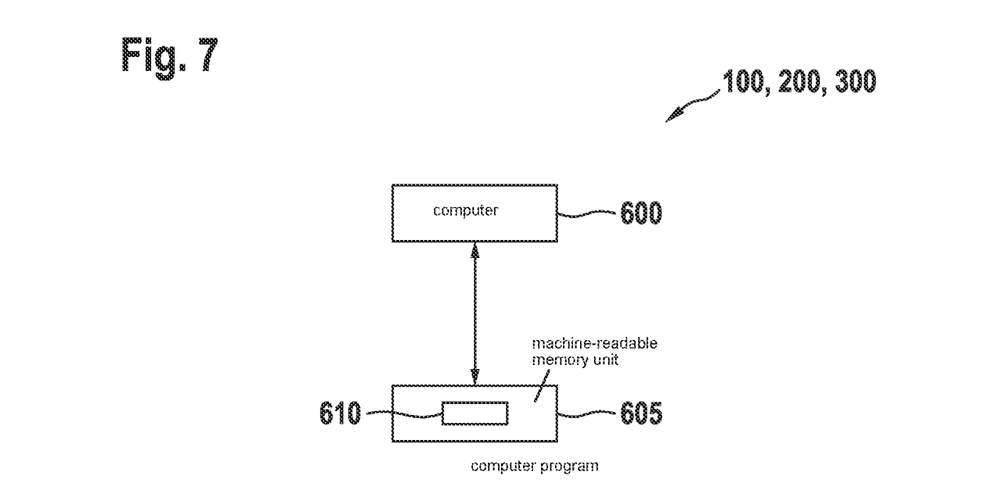
FIG. 7 shows a schematic illustration of a computer and a machine-readable memory medium, according to an example embodiment of the present invention.

FIG. 7 shows a schematic illustration of a computer 600 and a machine-readable memory medium 605. Computer 600 may also be designed, for example, as a central processing unit ECU for executing a driving task as described above. Machine-readable memory medium 605 may be designed, for example, as an external memory medium, as illustrated, or alternatively may be integrated into computer 600 itself. A computer program 610 is stored on machine-readable memory medium 605. Computer program 605 includes commands which, when computer program 605 is executed by a computer or a central processing unit for executing a driving task), prompt the computer to carry out a provided method 100, 200, 300 for executing a driving task in a decentralized control unit system 400, 500, which is used in vehicles, for example.

The implementation of provided method 100, 200, 300 may take place, for example, based on the following pseudo-code, which includes excerpts for two different scenarios with response options that may be implemented with the aid of arbitrary programming language. Further scenarios are possible. The programming may preferably take place in C or C++.

Scenario 1
   receiver==activity state is error-free ("activity"/"in spec" via continuous monitoring) &&
   sender 1-n==activity state is error-free/"in spec" (via continuous monitoring) & &
   sender 1-(n−1)==activity state is error-free/"in spec" (via continuous monitoring)
Case 1:
   receiver==activity state is error-free (activity/in spec) && "dynamic" operating state & &
   sender 1==activity state is error-free (activity/in spec) && "initialization" operating state
Result:
   sender 1 wait to proceed, system may be operational, but content not yet fully available
Case 2:
   receiver==activity state is error-free (activity/in spec) && "dynamic" operating state & &
   sender 1==activity state is error-free (activity/in spec) && "dynamic" operating state
Result:
   sender 1 can proceed, system is operational and "healthy"
Scenario 2:
   receiver==activity state is error-free ("activity"/"in spec" via continuous monitoring) &&
   sender 1-n==activity state is error-free ("activity"/"in spec" via continuous monitoring) &&
   sender 1-(n−1)==activity state contains errors ("not active"/"not in spec" via continuous monitoring)

Case 1:
receiver=activity state is error-free (activity/in spec) &&
"dynamic" operating state & &
sender 1=activity state contains errors ("not active"/"not in spec") & "dynamic" operating state
Result:
sender 1 debouncing and error response (substitute response and/or error message)

The pseudocode may, for example, be extended to all combinations that are illustrated in matrix 403 in FIG. 5B, and distributed over an arbitrary number n of control units, depending on the driving task. Debouncing in the second scenario may correspond to a jitter or a jump. Not every jump is passed on as an error/deviation for triggering an error response. For example, a value range of a signal may be considered for this purpose, it being possible to make a valuation as a multiple of a sending cycle time in order to identify an error that is present and to trigger an error response.

In other words, the pseudocode may be expressed as follows: If an error-free activity state has been ascertained in the continuous monitoring for the further processing of the data (in each case by the two senders and the receiver), during dynamic operation it may then be further ascertained which dynamic state combination the control units, i.e., the two senders and the receiver, are in relative to one another. The further processing of the computation may thus be correctly interpreted. During the dynamic operation, it is important that the activity state estimation is sufficiently expanded by dynamically special states, referred to above as operating states.

The check must be able to discern that various combinations are present between the operating states. Due to different electrical connections in the vehicle for the control unit system, the sender may have an "initialization" operating state, while the receiver may already have the "dynamic" or "operational" operating state. This combination must result in a "wait" operation on the receiver or the executing control unit, since, although no error-containing activity states are present and therefore the data of the sender may be trusted, the "functional" driving task is not yet executable due to the "initialization" operating state.

For the processing of the results, a dynamic value contribution of the senders to the overall computation result may then be ascertained. For example, a contribution quantity for the dynamic driving task may be defined for each sender. This contribution is centrally checked, for example by a central control unit in FIG. 6 as receivers 505, 510, 515, 520, for example as soon as data may be fused or also compared (if the activity states in each case have been identified as error-free, and the appropriate dynamic state estimation has taken place, i.e., senders and receivers are in dynamic operating states).

The present invention has been described in detail using preferred exemplary embodiments. Instead of the described exemplary embodiments, further exemplary embodiments are possible which may include further modifications or combinations of described features. For this reason, the present invention is not limited by the provided examples, since other variations may be derived therefrom by those skilled in the art without departing from the scope of protection of the present invention.

What is claimed is:

1. A method for executing a driving task in a decentralized control unit system, wherein, for executing the driving task, the decentralized control unit system includes at least two control units that are configured as senders, and at least one control unit that is configured as a receiver, each of the at least two senders and the at least one receiver having activity states and operating states, the method comprising the following steps:
   in a first step, checking, by each of the at least two senders and the at least one receiver, its own respective activity state with respect to an error status;
   in a second step, carrying out an evaluation of in which of a plurality of predefined operating states the at least two senders and the at least one receiver are presently in, wherein the plurality of operating states are each a respective stage of operation in the decentralized control unit system; and
   in a third step, executing the driving task based on satisfaction of a condition that (i) the at least two senders' own activity states and the at least one receiver's own activity state is error-free in each case and (ii) a result of the evaluation is that at least one of the at least two senders and the at least one receiver each has a dynamic operating state of the plurality of predefined operating states.

2. A method for executing a driving task in a decentralized control unit system, wherein, for executing the driving task, the decentralized control unit system includes at least two control units that are configured as senders, and at least one control unit that is configured as a receiver, each of the at least two senders and the at least one receiver having activity states and operating states, the method comprising the following steps:
   in a first step, checking by each of the at least two senders and the at least one receiver of its own activity state, the checking including a check of whether there is an error of a detected voltage drop and/or deviation from a predefined expected behavior at the at least two senders and/or at the at least one receiver;
   in a second step, comparing in each case the at least two senders' own activity states to the at least one receiver's own activity state;
   in a third step, carrying out an evaluation of operating states when the at least two senders' own activity states and the at least one receiver's own activity state is free of the error in each case; and
   in a fourth step, executing the driving task when one of the at least two senders and the at least one receiver each has a dynamic operating state.

3. The method as recited in claim 2, wherein, when an own activity state of the at least two senders and/or of the at least one receiver is identified as containing errors, in each case an error response for an affected sender and/or for an affected receiver is triggered in the second step, the error response being in the form of a substitute response and/or in the form of an error message, wherein the substitute response includes that the affected sender and/or the affected receiver remain disregarded for the third step, and only the operating states of one of the at least two senders and/or of the at least one receiver, whose own activity states in each case has been identified as error-free in the first step, being evaluated.

4. The method as recited in claim 1, wherein the plurality of operating states includes two or more of the following states: an operational state, a non-operational state, an initialization state, a delay state, a preprocessing state, a shutdown state, the dynamic state, and a static state.

5. The method as recited in claim 1, wherein the checking of the own activity states is periodically repeated.

6. The method as recited in claim 1, wherein the satisfaction of the condition is determined using a matrix of possible combinations of the activity states and/or the operating states.

7. The method as recited in claim 1, wherein the respective checks of respective activity states include checking whether there is an error of a voltage drop and/or a deviation from a predefined expected behavior at the at least two senders and the at least one receiver, respectively.

8. The method as recited in claim 7, wherein, when an own activity state of the at least two senders and/or of the at least one receiver is identified as containing the error, in each case an error response for an affected sender and/or for an affected receiver is triggered, the error response being in the form of a substitute response and/or in the form of an error message, wherein the substitute response includes that the affected sender and/or the affected receiver remain disregarded for the carrying out of the evaluation, and only the operating states of one of the at least two senders and/or of the at least one receiver whose own activity states in each case has been identified as error-free in the first step is evaluated.

9. A decentralized control unit system, wherein for executing a driving task, the decentralized control unit system includes at least two control units that are configured as senders and at least one control unit that is configured as a receiver, the at least two senders and the at least one receiver being communicatively linked to one another, each of the at least two senders and the at least one receiver having activity states and operating states, wherein:
   each of the at least two senders and the at least one receiver being configured to check its own respective activity state with respect to an error status;
   the at least one receiver is configured to carry out an evaluation of in which of a plurality of predefined operating states the at least two senders and the at least one receiver are presently in, wherein the plurality of operating states are each a respective stage of operation in the decentralized control unit system; and
   the at least one receiver is configured to execute the driving task based on satisfaction of a condition that (i) the at least two senders' own activity states and the at least one receiver's own activity state is error-free in each case and (ii) a result of the evaluation is that at least one of the at least two senders and the at least one receiver each has a dynamic operating state of the plurality of predefined operating states.

10. A decentralized control unit system, wherein for executing a driving task, the decentralized control unit system includes at least two control units that are configured as senders and at least one control unit that is configured as a receiver, the at least two senders and the at least one receiver being communicatively linked to one another, each of the at least two senders and the at least one receiver having activity states and operating states, wherein:
   each of the at least two senders and the at least one receiver is configured to check its own activity state, the checking including a check of whether there is an error of a detected voltage drop and/or deviation from a predefined expected behavior at the at least two senders and/or at the at least one receiver;
   the at least one receiver is configured to compare the own activity states of the at least two senders, in each case, to the own activity state of the at least one receiver;
   the at least one receiver is configured to carry out an evaluation of operating states when the own activity states of the at least two senders and the own activity state of the at least one receiver is in each case free of the error; and
   the at least one receiver is configured to execute the driving task when one of the at least two senders and of the at least one receiver each has a dynamic operating state.

11. The decentralized control unit system as recited in claim 10, wherein:
   when the at least two senders and/or the at least one receiver in each case identifies its own activity state as containing errors, the at least one receiver in each case triggers an error response for an affected sender and/or for an affected receiver; and
   the error response is in the form of a substitute response and/or in the form of an error message, the substitute response including that the affected sender and/or the affected receiver remain disregarded, and only the operating state of one of the at least two senders and/or of the at least one receiver, whose own activity state in each case has been identified as error-free, being evaluated.

12. A non-transitory machine-readable memory medium on which are stored a computer program for executing a driving task in a decentralized control unit system, wherein, for executing the driving task, the decentralized control unit system includes at least two control units that are configured as senders, and at least one control unit that is configured as a receiver, each of the at least two senders and the at least one receiver having activity states and operating states, the computer program, when executed by a computer, causing the computer to perform the following steps:
   in a first step, checking, by each of the at least two senders and the at least one receiver, its own respective activity state with respect to an error status;
   in a second step, carrying out an evaluation of in which of a plurality of predefined operating states the at least two senders and the at least one receiver are presently in, wherein the plurality of operating states are each a respective stage of operation in the decentralized control unit system; and
   in a third step, executing the driving task based on satisfaction of a condition that (i) the at least two senders' own activity states and the at least one receiver's own activity state is error-free in each case and (ii) a result of the evaluation is that at least one of the at least two senders and the at least one receiver each has a dynamic operating state of the plurality of predefined operating states.

* * * * *